(12) United States Patent
Mohajer et al.

(10) Patent No.: US 9,047,371 B2
(45) Date of Patent: Jun. 2, 2015

(54) SYSTEM AND METHOD FOR MATCHING A QUERY AGAINST A BROADCAST STREAM

(75) Inventors: Keyvan Mohajer, Los Gatos, CA (US); Bernard Mont-Reynaud, Sunnyvale, CA (US); Joe Aung, San Jose, CA (US)

(73) Assignee: SoundHound, Inc., Santa Clara, CA (US)

( * ) Notice: Subject to any disclaimer, the term of this patent is extended or adjusted under 35 U.S.C. 154(b) by 384 days.

(21) Appl. No.: 13/401,728

(22) Filed: Feb. 21, 2012

(65) Prior Publication Data

US 2012/0239175 A1   Sep. 20, 2012

Related U.S. Application Data

(63) Continuation-in-part of application No. 13/193,514, filed on Jul. 28, 2011.

(60) Provisional application No. 61/368,735, filed on Jul. 29, 2010, provisional application No. 61/547,028, filed on Oct. 13, 2011.

(51) Int. Cl.
*G06F 17/00* (2006.01)
*H04H 60/32* (2008.01)
(Continued)

(52) U.S. Cl.
CPC .......... *G06F 17/30743* (2013.01); *G10L 19/018* (2013.01); *H04H 60/372* (2013.01); *H04H 60/58* (2013.01)

(58) Field of Classification Search
CPC ...... G10L 19/018; H04H 20/14; H04H 60/13; H04H 60/27; H04H 60/29; H04H 60/33; H04H 60/35; H04H 60/41–60/44; H04H 60/48; H04H 60/49; H04H 60/51; H04H 60/52

USPC ....... 340/4.37, 4.4; 381/56; 700/94; 707/746, 707/747; 716/727; 725/18, 19
See application file for complete search history.

(56) References Cited

U.S. PATENT DOCUMENTS 3,919,479 A   11/1975   Moon et al.
4,450,531 A   5/1984   Kenyon et al.
(Continued)

FOREIGN PATENT DOCUMENTS

EP   0944033 A1   9/1999
EP   1367590 A2   12/2003
(Continued)

OTHER PUBLICATIONS

International Search Report, appl. No. PCT/2009.066458, mailed Jun. 23, 2010.
(Continued)

*Primary Examiner* — Jesse Elbin
(74) *Attorney, Agent, or Firm* — Haynes Beffel & Wolfeld LLP; Ernest J. Beffel, Jr.

(57) ABSTRACT

A method for identifying with a broadcast stream. That method includes receiving one or more broadcast streams, from which it generates and stores an audio fingerprint of a selected portion of each received broadcast stream. A query is received, and the method generates an audio fingerprint of the query. From that point, the method continues by identifying audio content from the query, using the query audio fingerprint and a database of indexed audio content. The method concludes by identifying the source of the query using the query audio fingerprint and the stored audio fingerprints. Embodiments of the method further include predictively caching audio fingerprint sequences and corresponding audio item identifiers from a server after storing audio fingerprints extracted from the broadcast stream; and using the predictively cached audio fingerprint sequences to identify an audio item within the audio signal based on at least some additional audio fingerprints of the audio signal.

30 Claims, 7 Drawing Sheets

(51) Int. Cl.
*H04R 29/00* (2006.01)
*G06F 7/00* (2006.01)
*G06F 17/30* (2006.01)
*H04H 60/37* (2008.01)
*H04H 60/58* (2008.01)
*G10L 19/018* (2013.01)

(56) References Cited

U.S. PATENT DOCUMENTS

| | | |
|---|---|---|
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,928,249 A | 5/1990 | Vermesse |
| 4,959,850 A | 9/1990 | Marui |
| 5,019,899 A | 5/1991 | Boles et al. |
| 5,164,915 A | 11/1992 | Blyth |
| 5,436,653 A | 7/1995 | Ellis et al. |
| 5,437,050 A | 7/1995 | Lamb et al. |
| 5,511,000 A | 4/1996 | Kaloi et al. |
| 5,542,138 A | 8/1996 | Williams et al. |
| 5,577,249 A | 11/1996 | Califano |
| 5,581,658 A | 12/1996 | O'Hagan et al. |
| 5,664,270 A | 9/1997 | Bell et al. |
| 5,687,279 A | 11/1997 | Matthews |
| 5,708,477 A | 1/1998 | Forbes et al. |
| 5,862,260 A | 1/1999 | Rhoads |
| 5,874,686 A | 2/1999 | Ghias et al. |
| 5,880,386 A | 3/1999 | Wachi et al. |
| 5,907,815 A | 5/1999 | Grimm et al. |
| 5,918,223 A | 6/1999 | Blum et al. |
| 5,956,683 A | 9/1999 | Jacobs et al. |
| 5,963,957 A | 10/1999 | Hoffberg |
| 5,991,737 A | 11/1999 | Chen |
| 6,049,710 A | 4/2000 | Nilsson |
| 6,067,516 A | 5/2000 | Levay et al. |
| 6,092,039 A | 7/2000 | Zingher |
| 6,108,626 A | 8/2000 | Cellario et al. |
| 6,121,530 A | 9/2000 | Sonoda |
| 6,122,403 A | 9/2000 | Rhoads |
| 6,182,128 B1 | 1/2001 | Kelkar et al. |
| 6,188,985 B1 | 2/2001 | Thrift et al. |
| 6,201,176 B1 | 3/2001 | Yourlo |
| 6,233,682 B1 | 5/2001 | Fritsch |
| 6,314,577 B1 | 11/2001 | Pocock |
| 6,345,256 B1 | 2/2002 | Milsted et al. |
| 6,363,349 B1 | 3/2002 | Urs et al. |
| 6,385,434 B1 | 5/2002 | Chuprun et al. |
| 6,405,029 B1 | 6/2002 | Nilsson |
| 6,408,272 B1 | 6/2002 | White et al. |
| 6,434,520 B1 | 8/2002 | Kanevsky et al. |
| 6,453,252 B1 | 9/2002 | Laroche |
| 6,504,089 B1 | 1/2003 | Negishi et al. |
| 6,505,160 B1 | 1/2003 | Levy et al. |
| 6,507,727 B1 | 1/2003 | Henrick |
| 6,510,325 B1 | 1/2003 | Mack, II et al. |
| 6,519,564 B1 | 2/2003 | Hoffberg et al. |
| 6,542,869 B1 | 4/2003 | Foote |
| 6,594,628 B1 | 7/2003 | Jacobs et al. |
| 6,611,607 B1 | 8/2003 | Davis et al. |
| 6,614,914 B1 | 9/2003 | Rhoads et al. |
| 6,633,845 B1 | 10/2003 | Logan et al. |
| 6,633,846 B1 | 10/2003 | Bennett et al. |
| 6,640,306 B1 | 10/2003 | Tone et al. |
| 6,834,308 B1 | 12/2004 | Ikezoye et al. |
| 6,850,288 B2 | 2/2005 | Kurokawa |
| 6,931,451 B1 | 8/2005 | Logan et al. |
| 6,941,275 B1 | 9/2005 | Swierczek |
| 6,967,275 B2 | 11/2005 | Ozick |
| 6,990,453 B2 | 1/2006 | Wang et al. |
| 6,995,309 B2 | 2/2006 | Samadani et al. |
| 7,017,208 B2 | 3/2006 | Weismiller et al. |
| 7,058,376 B2 | 6/2006 | Logan et al. |
| 7,174,293 B2 | 2/2007 | Kenyon et al. |
| 7,190,971 B1 | 3/2007 | Kawamoto |
| 7,206,820 B1 | 4/2007 | Rhoads et al. |
| 7,209,892 B1 | 4/2007 | Galuten et al. |
| 7,233,321 B1 | 6/2007 | Larson et al. |
| 7,257,536 B1 | 8/2007 | Finley et al. |
| 7,266,343 B1 | 9/2007 | Yli-juuti et al. |
| 7,323,629 B2 | 1/2008 | Somani et al. |
| 7,328,153 B2 | 2/2008 | Wells et al. |
| 7,373,209 B2 | 5/2008 | Tagawa et al. |
| 7,379,875 B2 | 5/2008 | Burges et al. |
| 7,444,353 B1 | 10/2008 | Chen et al. |
| 7,516,074 B2 | 4/2009 | Bilobrov |
| 7,562,392 B1 | 7/2009 | Rhoads et al. |
| 7,567,899 B2 | 7/2009 | Bogdanov |
| 7,580,832 B2 | 8/2009 | Allamanche et al. |
| 7,672,916 B2 | 3/2010 | Poliner et al. |
| 7,743,092 B2 | 6/2010 | Wood |
| 7,756,874 B2 | 7/2010 | Hoekman et al. |
| 7,783,489 B2 | 8/2010 | Kenyon et al. |
| 7,853,664 B1 | 12/2010 | Wang et al. |
| 7,858,868 B2 | 12/2010 | Kemp et al. |
| 7,881,657 B2 | 2/2011 | Wang et al. |
| 7,899,818 B2 | 3/2011 | Stonehocker et al. |
| 7,908,135 B2 | 3/2011 | Shishido |
| 8,013,230 B2 | 9/2011 | Eggink |
| 8,073,684 B2 | 12/2011 | Sundareson |
| 8,086,171 B2 | 12/2011 | Wang et al. |
| 8,116,746 B2 | 2/2012 | Lu et al. |
| 8,358,966 B2 * | 1/2013 | Zito et al. ............... 455/2.01 |
| 2001/0005823 A1 | 6/2001 | Fischer et al. |
| 2002/0023020 A1 | 2/2002 | Kenyon et al. |
| 2002/0049037 A1 | 4/2002 | Christensen et al. |
| 2002/0072982 A1 | 6/2002 | Barton et al. |
| 2002/0083060 A1 | 6/2002 | Wang et al. |
| 2002/0174431 A1 | 11/2002 | Bowman et al. |
| 2002/0181671 A1 | 12/2002 | Logan |
| 2002/0193895 A1 | 12/2002 | Qian et al. |
| 2002/0198705 A1 | 12/2002 | Burnett |
| 2002/0198789 A1 | 12/2002 | Waldman |
| 2003/0050784 A1 | 3/2003 | Hoffberg et al. |
| 2003/0106413 A1 | 6/2003 | Samadani et al. |
| 2003/0192424 A1 | 10/2003 | Koike |
| 2004/0002858 A1 | 1/2004 | Attias et al. |
| 2004/0231498 A1 | 11/2004 | Li et al. |
| 2005/0254366 A1 | 11/2005 | Amar |
| 2005/0273326 A1 | 12/2005 | Padhi et al. |
| 2006/0059225 A1 | 3/2006 | Stonehocker et al. |
| 2006/0122839 A1 | 6/2006 | Li-Chun Wang et al. |
| 2006/0169126 A1 | 8/2006 | Ishiwata et al. |
| 2006/0189298 A1 | 8/2006 | Marcelli |
| 2006/0277052 A1 | 12/2006 | He et al. |
| 2007/0010195 A1 | 1/2007 | Brown et al. |
| 2007/0016404 A1 | 1/2007 | Kim et al. |
| 2007/0055500 A1 | 3/2007 | Bilobrov |
| 2007/0120689 A1 | 5/2007 | Zerhusen et al. |
| 2007/0168409 A1 | 7/2007 | Cheung |
| 2007/0168413 A1 | 7/2007 | Barletta et al. |
| 2007/0204319 A1 | 8/2007 | Ahmad et al. |
| 2007/0239676 A1 | 10/2007 | Stonehocker et al. |
| 2007/0260634 A1 | 11/2007 | Makela et al. |
| 2008/0022844 A1 | 1/2008 | Poliner et al. |
| 2008/0026355 A1 | 1/2008 | Petef |
| 2008/0082510 A1 * | 4/2008 | Wang et al. ............... 707/3 |
| 2008/0134264 A1 * | 6/2008 | Narendra et al. ............ 725/110 |
| 2008/0215319 A1 | 9/2008 | Lu et al. |
| 2008/0235872 A1 | 10/2008 | Newkirk et al. |
| 2008/0256115 A1 | 10/2008 | Beletski et al. |
| 2009/0031882 A1 | 2/2009 | Kemp et al. |
| 2009/0119097 A1 | 5/2009 | Master et al. |
| 2009/0125298 A1 | 5/2009 | Master et al. |
| 2009/0125301 A1 | 5/2009 | Master et al. |
| 2009/0228799 A1 | 9/2009 | Verbeeck et al. |
| 2010/0014828 A1 | 1/2010 | Sandstrom et al. |
| 2010/0211693 A1 | 8/2010 | Master et al. |
| 2011/0132173 A1 | 6/2011 | Shishido |
| 2011/0132174 A1 | 6/2011 | Shishido |
| 2011/0173208 A1 * | 7/2011 | Vogel ............... 707/746 |
| 2011/0213475 A1 | 9/2011 | Herberger et al. |
| 2011/0244784 A1 | 10/2011 | Wang |

(56) References Cited

U.S. PATENT DOCUMENTS

| | | |
|---|---|---|
| 2011/0276334 A1 | 11/2011 | Wang et al. |
| 2012/0029670 A1 | 2/2012 | Mont-Reynaud et al. |
| 2012/0232683 A1 | 9/2012 | Master et al. |
| 2013/0052939 A1* | 2/2013 | Anniballi et al. ............ 455/3.01 |

FOREIGN PATENT DOCUMENTS

| | | |
|---|---|---|
| JP | 11-272274 | 10/1999 |
| JP | 2000187671 A | 7/2000 |
| WO | 9517746 A1 | 6/1995 |
| WO | 99/18518 A2 | 4/1999 |
| WO | 03061285 A2 | 7/2003 |
| WO | 2010018586 A2 | 2/2010 |

OTHER PUBLICATIONS

InData Corporation, DepoView Video Review Software Product Description, "InData's Newest Video Deposition Viewer", Dec. 2007, 2 pgs.

InData Corporation, DepoView Video Review Software Product Brochure, Jun. 2008, 4 Pgs.

InData Corporation, DepoView Video Review Software Product Description, http://indatacorp.com/depoview.html, accessed Nov. 8, 2011, 2 Pgs.

Sony Ericsson's W850i Walkman Phone Now Available in the Middle East. Al-Bawaba News, 2006 Al-Bawaba. Dec. 11, 2006. Factiva, Inc. <www.albawaba.com>. 2 pages.

Blackburn, Steven G. "Content Based Retrieval and Navigation of Music", University of Southampton, Departmenf of Electronics and Computer Science, Faculty of Engineering and Applied Science. Mar. 10, 1999. 41 Pages.

Blackburn, Steven, et al. "A Tool for Content Based Navigation of Music". University of Southampton, Department of Electronics and Computer Science, Multimedia Research Group. Copyright 1998 ACM 1-58113-036-8/98/0008. pp. 361-368.

Blackburn, Steven George. "Content Based Retrieval and Navigation of Music Using Melodic Pitch Contours". University of Southampton, Department of Electronics and Computer Science, Faculty of Engineering and Applied Science. Sep. 26, 2000. 136 Pages.

Blackburn, Steven G. "Search by Humming". University of Southampton, Department of Electronics and Computer Science, Faculty of Engineering. May 8, 1997. 69 Pages.

Hum That Tune, Then Find it on the Web. NPR: Weekend Edition—Saturday, WKSA. Copyright 2006 National Public Radio. Dec. 23, 2006. Factiva, Inc. 2 pages.

Casey, Michael A., et al., "Content-Based Music Information Retrieval: Current Directions and Future Challenges". Apr. 2008, vol. 96, No. 4. Copyright 2008 IEEE. Retrieved from IEEE Xplore [retrieved on Dec. 29, 2008 at 18:02]. 29 Pages.

Wagstaff, Jeremy. "Loose Wire: New Service Identifies Songs You Hum". WSJA Weekend Journal. Copyright 2006, Dow Jones & Company, Inc. Dec. 25, 2006. Factiva, Inc. 2 pages.

Saltzman, Marc. "The Best Things in life are Free—For Your iPhone". Home Electronics and Teechnology, For Canwest News Service. Copyright 2008 Edmonton Journal. Nov. 12, 2008. Factiva, Inc. 2 pages.

First Products with Gracenote Technology to Ship in 2008. Warren's Consumer Electronics Daily. Copyright 2007 Warren Publishing, Inc. Sep. 18, 2007. Factiva, Inc. 2 pages.

Gracenote Readies New Services, But Video Initiative Stalls. Warren's Consumer Electronics Daily. Copyright 2005 Warren Publishing, Inc. vol. 5; Issue 122. Jun. 24, 2005. Factiva, Inc. 2 pages.

Furui, Sadaoki. "Digital Speech Processing, Synthesis, and Recognition". Second Edition, Revised and Expanded. Nov. 17, 2000. ISBN 978-0824704520. 17 pages.

Ghias, Asif, et al. "Query by Humming". Musical Information Retrieval in an Audio Database. Cornell University 1995. 6 Pages.

Ghias, Asif, et al. "Query by Humming—Musical Information Retrieval in an Audio Database". ACM Multimedia 95—Electronic Proceedings. San Francisco, Ca. Nov. 5-9, 1995. 13 Pages.

Han, Byeong-jun, et al. "M-Musics: Mobile Content-Based Music Retrieval System". Copyright 2007, Augsburg, Bavaria, Germany. ACM 978-1-59593-01-8/07/0009. Sep. 23-28, 2007. pp. 469-470. 2 Pages.

Jang, Jyh-Shing Roger, et al. "A General Framework of Progressive Filtering and its Application to Query to Singing/Humming". IEEE Transactions on Audio, Speech, and Language Processing, vol. 16. No. 2, Feb. 2008. pp. 350-358. 9 Pages.

Kosugi, Naoko, et al. "A Practical Query-By-Humming System for a Large Music Database". NTT Laboratories, Japan. ACM Multimedia Los Angeles, CA, USA. Copyright ACM 2000 1-58113-198-04/00/10. pp. 333-342. 10 Pages.

McNab, Rodger J., et al. "Towards the Digital Music Library: Tune Retrieval from Acoustic Input". University of Waikato, Department of Computer Science, School of Education. DL 1996, Bethesda MD USA. Copyright 1996 ACM 0-89791-830-4/96/03. p. 11-18. 8 Pages.

McNab, Rodger J., et al. "The New Zealand Digital Library MELody inDEX". University of Waikato, Department of Computer Science. D-Lib Magazine, May 1997 [retrieved on Jun. 12, 2011 at 11:25:49 AM]. ISSN 1082-9873. Retrieved from the Internet: <http://dlib.org/dlib/may97/meldex/05written.html>, 13 pages.

Pardo, Bryan, et al. "The VocalSearch Music Search Engine". EECS, Northwestern University. JCDL 2008, Pittsburgh, Pennsylvania, USA. Jun. 16-20, 2008, ACM 978-1-59593-998-Feb. 6, 2008. p. 430. 1 Page.

Mobile Music: Comcast Cellular First in U.S. to Trial Breakthrough Interactive Music Service Called *CD. Copyright PR Newswire, New York. ProQuest LLC. Feb. 11, 1999. Retrieved from the Internet: <http://proquest.umi.com. libproxy.mit.edu/pqdwb?did=38884944&sid=3&Fmt=3&clientld=5482&RQT=309&VName=PQD>. 3 pages.

Song, Jungmin, et al. "Query by Humming: Matching Humming Query to Polyphonic Audio". LG Electronics, Seoul, Korea. Copyright 2002 IEEE. 0/7809-7304-9/02. p. 329-332. 4 Pages.

Taylor, Chuck. "Company Lets Listeners Dial for CDs". Billboard, vol. 1, No. 26, General Interest Module. Jun. 26, 1999. p. 86-87. 2 pages.

Can't Get That Song Out of Your Head. Copyright 2007 The Jakarta Post. May 20, 2007. Factiva, Inc. 2 Pages.

Typke, Rainer, et al. "A Survey of Music Information Retrieval Systems". Universiteit Utrecht, The Netherlands. Copyright 2005 Queen Mary, University of London. 8 Pages.

Wang, Avery. "The Shazam Music Recognition Service". Communications of the ACM, vol. 49, No. 8. Aug. 2006. ACM 0001-0782/06/0800. pp. 44-48. 5 pages.

Melodis Rolls Out midomi mobile. Wireless News. Copyright 2008 M2 Communications, Ltd. Mar. 6, 2008. 1 Page.

Zhu, Yunyue, et al. "Warping Indexes with Envelope Transforms for Query by Humming". New York University, New York. SIGMOD Copyright 2003, San Diego, CA. Jun. 9-12, 2003. ACM 1-58113-634-X/03/06. pp. 181-192. 12 Pages.

International Preliminary Report on Patentability dated Jun. 7, 2011 for Application No. PCT/US2009/066458, 7 pages.

Wang et al., "Method and Apparatus for Recognizing Sound and Music Signals in High Noise and Distortion", U.S. Appl. No. 60/222,023, dated Jul. 31, 2000, 26 pages.

Rhoads, G., "Methods and Systems Employing Digital Watermarking", U.S. Appl. No. 60/134,782, dated May 19, 1999, 47 pages.

Finley, Michael, et al., "Broadcast Media Purchasing System", U.S. Appl. No. 60/166,965, dated Nov. 23, 1999, 21 pages.

Swierczek, Remi, "Music Identification System", U.S. Appl. No. 60/158,087 dated Oct. 7, 1999, 12 pages.

Swierczek, Remi, "Music Identification System", U.S. Appl. No. 60/186,565, dated Mar. 2, 2000, 14 pages.

Chou, Ta-Chun, et al., "Music Databases: Indexing Techniques and Implementation", Proceedings of International Workshop on Multimedia Database Management Systems, IEEE, dated Aug. 14-16, 1996, pp. 46-53, 8 pages.

McPherson, John R. and Bainbridge, David, "Usage of the MELDEX Digital Music Library", 1999, in Proceedings of the International Symposium on Music Information Retrieval, (Bloomington, IN, USA, 2001), pp. 19-20, 2 pages.

(56) References Cited

OTHER PUBLICATIONS

Wold, Erling, et al., "Classification, Search, and Retrieval of Audio", Muscle Fish, Berkeley, CA, USA, CRC Handbook of Multimedia Computing 1999, pp. 1-19, 18 pages.
Wold et al., "Content-Based Classification, Search and Retrieval of Audio", IEEE Multimedia 1070-986X/96, vol. 3, No. 3: Fall 1996, pp. 27-36 (17 pages).
Horn, Patricia, "What was that song? With a wireless phone, find out what you heard on the radio.", The Inquirer, Philadelphia, Pennsylvania, USA, dated Feb. 11, 1999, 3 pages.
Kenyon, Stephen, et al., U.S. Appl. No. 60/218,824 for Audio Identification System and Method, Jul. 18, 2000, 45 pages.
Kenyon, Stephen, U.S. Appl. No. 60/155,064 for Automatic Program Identification System and Method, Sep. 21, 1999, 49 pages.

* cited by examiner

SYSTEM AND METHOD FOR MATCHING A QUERY AGAINST A BROADCAST STREAM

CROSS-REFERENCE TO RELATED APPLICATION

This application is a continuation in part of U.S. patent application Ser. No. 13/193,514 entitled "System and Methods for Continuous Audio Matching," filed 28 Jul. 2011 which in turn claims the benefit of U.S. Provisional Application No. 61/368,735 of the same title, filed 29 Jul. 2010 both of which are incorporated by reference herein.

This application claims the benefit of U.S. Provisional Patent Application No. 61/547,028 entitled "System and Method for Matching a Query against a Broadcast Stream," filed on 13 Oct. 2011. That application is incorporated by reference in its entirety for all purposes.

BACKGROUND

This application deals generally with the field of automated content recognition, and more specifically with systems involved with recognition of broadcast content.

Thousands of broadcast sources (including radio, TV, satellite and online stations) stream audio content over communication media such as the internet; a computer server can monitor many such streams simultaneously. Systems now exist that allow users to submit queries and receive identification of content that matches in a pre-indexed database. Pre-indexed items include recorded music, and systems can identify such items appearing either as primary content or as background behind an announcer's voice. Examples of such systems can be seen, for example, in U.S. Pat. App. Pub. No. 2010/0145708 entitled "System and Method for Identifying Original Music," which publication is incorporated herein in its entirety.

Other content may not be pre-indexed, such as live news, talk shows, or advertising. Even when specific audio content cannot be identified, it would be useful to a user to know the source of the broadcast stream, along with other information available about the programming. Conversely, information such as the user's station listening patterns could be collected and used, within the legal limits of Terms of Use agreements. This could be highly interesting to broadcasters.

For example, after a song from a local radio station has been identified, and the user's device displays the song's name and artist, it would be also useful for the device to display a list of songs that the station played recently, or a live link to the radio station's website, or other content that could provide value to the radio station, the users, or other parties. The user could interact with the station by participating in contests, voting or subscribing to the station. Radio stations can also take advantage of query matches to engage and interact with their listeners. Additionally, the broadcaster could offer the user special deals or coupons. The knowledge of what station a user listens to may be of interest for other tracking and analysis purposes. Optionally, the use of location data such as GPS may make station selection more reliable. Finally, matching station content with an index database helps to create accurate station playlists, and can enable faster and better user query matching.

Thus, a need exists for improved methods for identifying and interacting with broadcast content.

SUMMARY

One aspect of the disclosure is a method for identifying a broadcast stream. That method begins by receiving one or more broadcast streams, from which it generates and stores an audio fingerprint of a selected portion of each received broadcast stream. A query is received, and the method generates an audio fingerprint of the query. From that point, the method continues by identifying audio content from the query, using the query audio fingerprint and a database of indexed audio content. The method concludes by identifying the source of the query using the query audio fingerprint and the stored audio fingerprints.

Embodiments of the disclosure may predictively cache audio fingerprint sequences and corresponding audio item identifiers from a server after storing audio fingerprints extracted from the broadcast and use the predictively cached audio fingerprint sequences to identify an audio item within the audio signal based on at least some additional audio fingerprints of the audio signal.

Another aspect of the disclosure is a method for identifying a broadcast stream. This method commences by receiving one or more broadcast streams, from which it generates and stores an audio fingerprint of a selected portion of each received broadcast stream, together with extracted information from the broadcast stream. The method then receives a query, whereupon it generates an audio fingerprint of the query. Analysis begins by attempting to match the query fingerprint to the stored audio fingerprints, and if the match is successful, identifying the match result as a double match. If the match is not successful, the method continues by identifying query audio content and the source of the query, using information from the stored audio fingerprints and the stored extracted information, and a database of indexed audio content. It then integrates the results of the identifying operation to identify either a broadcast stream match or a content match.

Yet another aspect of the disclosure is a method for identifying and interacting with a broadcast stream. This method begins by receiving one or more broadcast streams, from which it generates and stores an audio fingerprint of a selected portion of each received broadcast stream, together with extracted information from the broadcast stream. It then continues by identifying broadcast stream audio content and the broadcast stream, using a combination of information from the stored audio fingerprints, the stored extracted information, and a static database of indexed audio content.

BRIEF DESCRIPTION OF THE DRAWINGS

The drawing figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

This application discloses a system and method for identifying and interacting with a broadcast stream. One portion of the system receives, processes, and stores information extracted from a number of broadcast streams. An array of antenna-based tuners can receive broadcast streams such as radio and TV channels via terrestrial or satellite transmissions; alternatively, web stream monitors may be used to receive selected radio streams, which were typically re-broadcast on internet with a significant delay relative to the original broadcast signal. The streams are forwarded to a fingerprint module, which stores and acts upon a preselected, continuously updated portion of the broadcast stream. This module extracts an audio fingerprint of the saved portion of each broadcast stream, and that audio fingerprint is saved as well. A user, employing a handheld device, desktop device, or the like, submits to the system a query consisting of a portion of captured audio, either from a broadcast or from the user's environment (such as music being played on a stereo system, or someone singing); the query may also include additional identification and location data. The system creates an audio fingerprint of the query audio and uses it to identify the source of the query, among the monitored broadcast streams.

The query may also be matched against a catalog of pre-indexed content. The term catalog is employed herein to indicate classes of content that have been analyzed, fingerprinted, and indexed. Often, catalog content may be musical content, allowing identification of a given song or musical performance. Besides music, a great variety of other recorded content may be indexed, including audio from advertisements, or any other known material where an audio recording may have been associated with identification data and other data. A given system provider will know what classes of content have been indexed, and thus can tailor identification processes to the specific types of catalog content that are available on that system.

Thus, in addition to identifying the broadcast stream containing the query, the system can also identify particular content and provide responses to the user from the combined use of information about broadcast streams, about indexed content, and additional context information. The responses may also change over time, allowing the system to give a prompt first response, and to provide additional information later.

For example, the system can allow the sponsors of the broadcast stream to make particular offers to the user, or to provide specific information to the user.

Embodiments

Figure 1A:
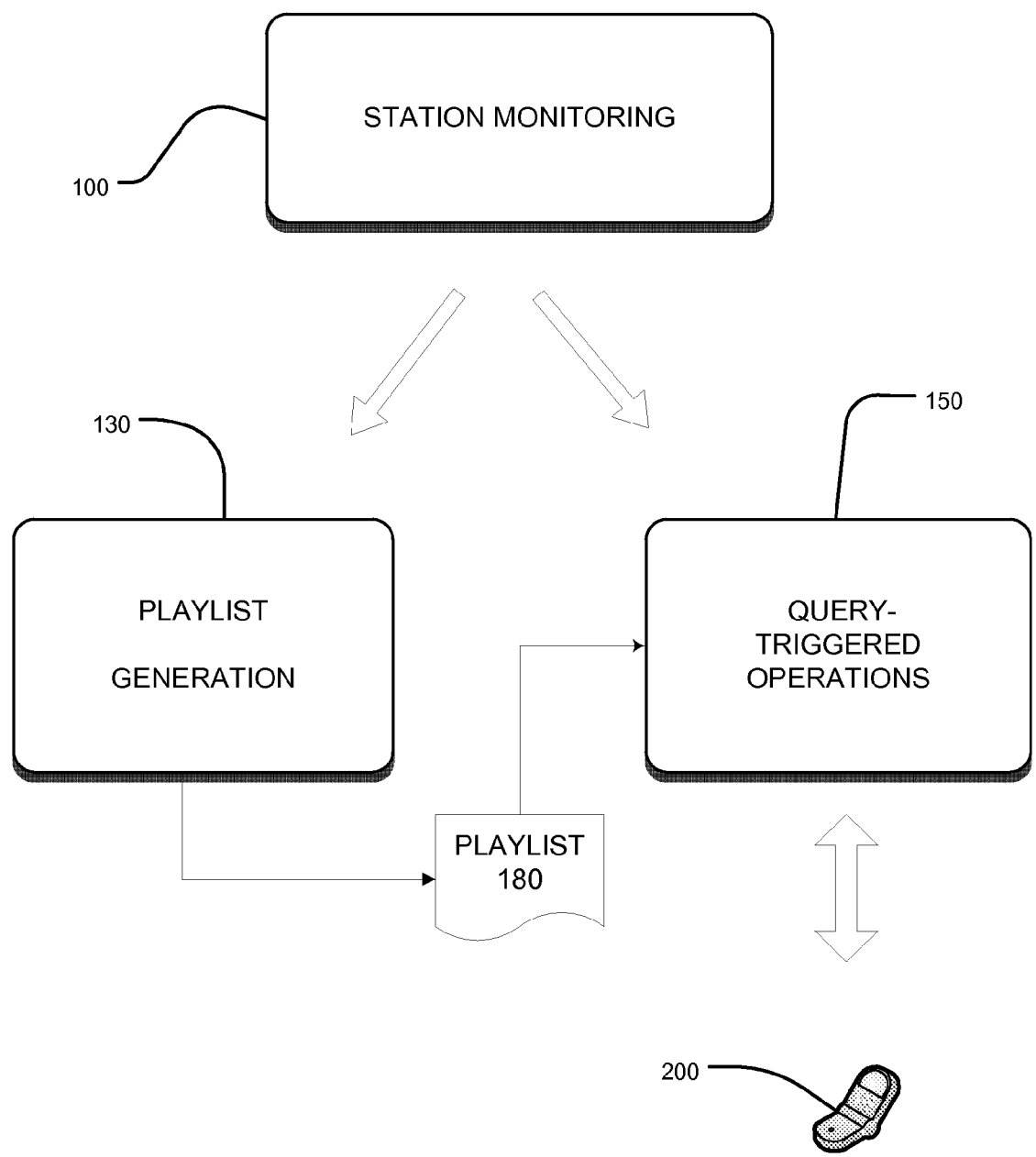
FIG. 1A is an overall block diagram of a system for identifying broadcast content, in accordance with the principles of the present disclosure.

FIG. 1A is an overall block diagram of a system for identifying and interacting with broadcast content in accordance with the present disclosure. The system can be broken down into three groups of operations. A set of station monitoring operations 100 performs actions that are always required, regardless of which process paths are involved in further processing. Basic broadcast stream inputs and processing operations are performed here. A playlist generation module 130 operates continuously, regardless of whether the system does or does not interact with a user. The operations involved in this module serve to analyze broadcast streams to determine their content. An output from ongoing process block 130 is a playlist 180 for each monitored broadcast stream. A set of query-triggered operations 150 operate side-by-side with the playlist generation module 130. Here, however, no actions are performed until a user employs a communication device 200 to submit a query, generally consisting of a snippet of a broadcast stream. Upon receiving such an input, the query-triggered operations 150 operate to identify the broadcast stream and particular content and provide that information as a response to the user.

It should be noted that all of the presented systems are made up of conventional computer and communications equipment known to those of skill in the art. Preferably, the systems are configured as networks of servers operating on the Internet. The specific operations detailed herein are performed by specifically configuring these known devices to perform unique functions through the application of specifically-tailored instructions, generally provided by software. The software can be provided in the forms of computer-readable media, application-specific chips (ASIC) or firmware, as desired and convenient for a particular scenario. Identification and specific operation of the compliments that would make up such a system are well known to the art and need no further discussion here. Moreover, those of ordinary skill in the art will be able to employ the functional descriptions contained below to generate effective software implementations.

Figure 1B:
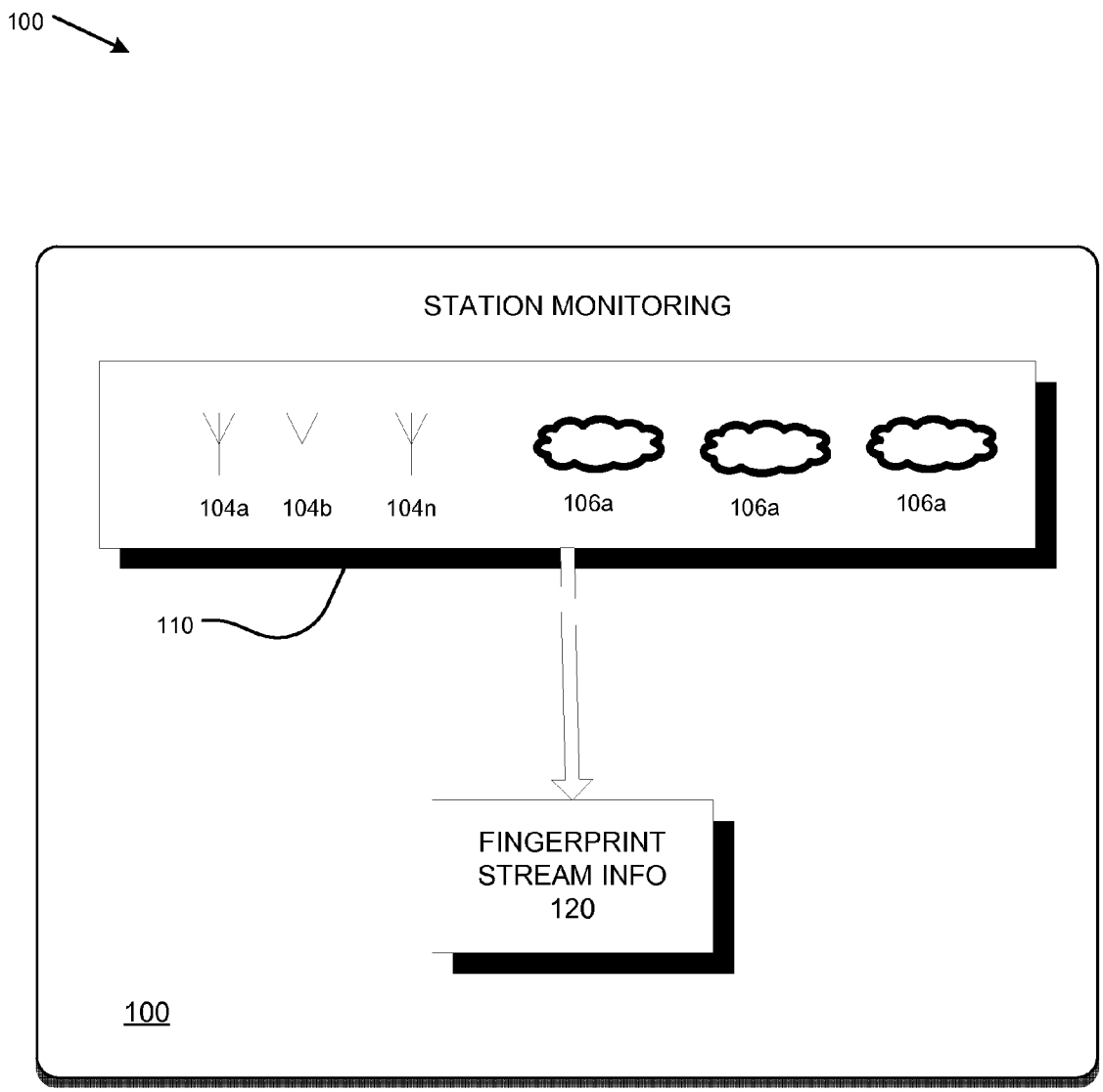
FIGS. 1B-1D are detail block diagrams of portions of the system depicted in FIG. 1A.

FIG. 1B provides a detailed representation of the stream monitoring system block 100. Here, a receiver subsystem 110 gathers and outputs broadcast signals from a variety of sources. As part of this, an antenna-based tuner array 104 includes tuner elements 104a, 104b . . . 104n. These tuner elements are wholly conventional, and adapted to receive audio signals from AM or FM radio stations, satellite radio stations, or television stations. Elements that receive television signals separate and process only the audio portion of the signal. While effective use of resources will necessarily impose constraints on the number of broadcast channels that can be selected for capture at any one time, those in the art will understand that devices can be structured for economical parallel operation and provided in sufficient numbers to cover the primary broadcast outlets in most metropolitan areas (SMSA's) or to allow the selection of a specific subset of stations, if preferred.

In addition to broadcast sources, Internet broadcast receivers 106 can be provided as well. With a large number of broadcast media employing web distribution in addition to direct broadcasting, receiving web broadcasts may well improve the quality of the reception signal, or the coverage of the system, at the expense of latencies (delays) which are explained in more detail below; this alternative approach to station capture will be good for some applications and not for others; in general the receiver system 100 can use both approaches simultaneously. If the system is designed to serve an area greater than a single SMSA, local receivers may be employed to directly receive radio or television signals and forward them to the stream monitoring system 100. In that case, the retransmission delays will be under the system's control, and may be smaller. In all cases, the system will know what type of station input path is in use, and it can process delays accordingly. Those of skill in the art will be entirely capable of designing and assembling receiver 110, including the provision of remotely scattered devices. Finally, it should be noted that receiver 110 provides signals in digital form. A digital output can be directly generated, or in some cases the incoming signal may be received in analog format and then passed through an analog-to-digital converter. In one implementation, the raw antenna RF signal may be digitized at a high sample rate, and processed by firmware before individual station channels are selected and the audio+metadata obtained. All variant implementations are common practice in the art, and any combination of them could be used here.

Figure 2:
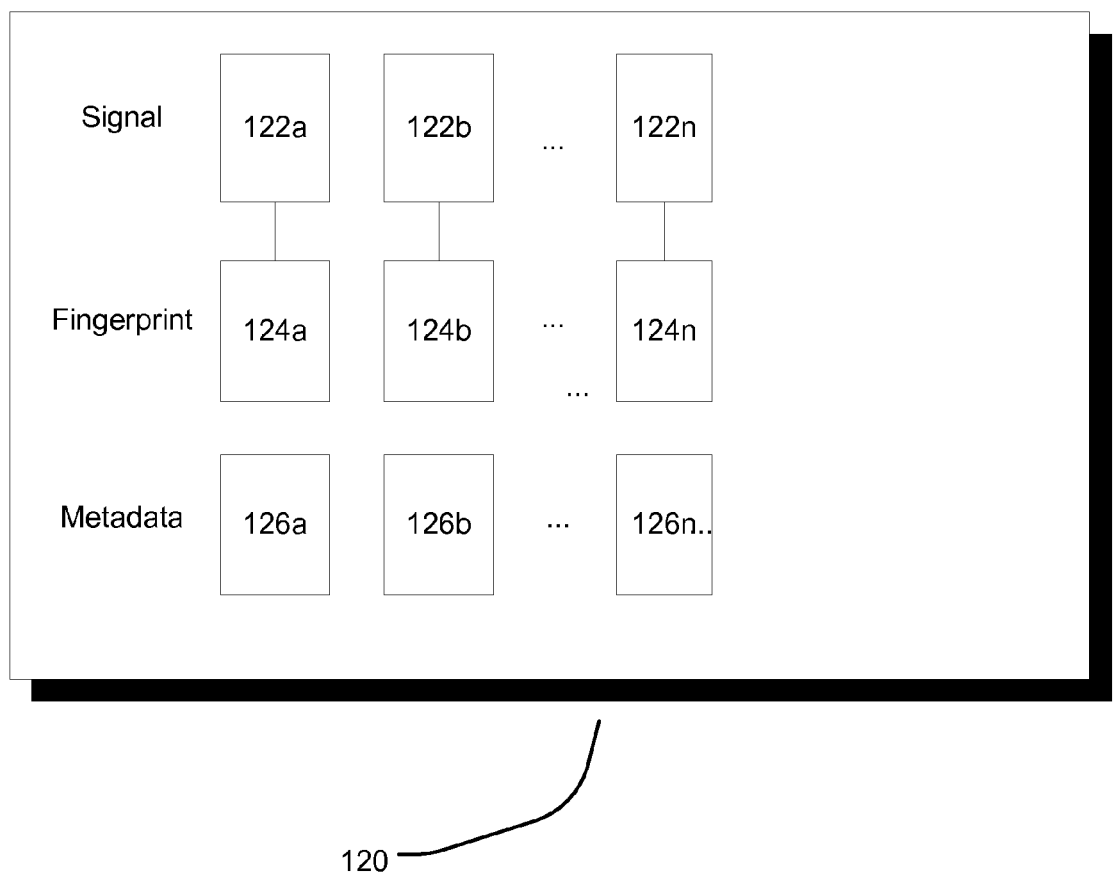
FIG. 2 is a block diagram of a further portion of the system depicted in FIG. 1A.

The set of digital signals gathered in receiver 110 is then passed to fingerprint module 120 for processing, as shown in detail in FIG. 2. As seen there, for each signal stream, fingerprint module 120 provides a signal buffer 122 a fingerprint buffer 124, and a metadata buffer 126. Thus, the system includes a set of signal buffers 122a, 122b . . . 122n, fingerprint buffers 124a, 124b . . . 124n, and metadata buffers 126a, 126b . . . 126n. Each signal buffer 122 retains signal content corresponding to a selected period of time, such as 30 seconds, 1 minute, or several minutes, depending upon application requirements, knowledge of typical delays, as well as the processing capability and amount of storage available to the system. A typical system will retain 30 s to 5 min of content from each station. In its storage condition, the content will be stored in what amounts to a ring data structure, a structure well known in the art. Techniques for working with and storing continuous streams of broadcast data are set out in U.S. Provisional Patent Application 61/368,735 entitled "System and Methods for Continuous Audio Matching," cited above.

The transmission and analysis of unprocessed digital audio data are generally too slow to be useful; therefore the signal data in audio buffers is usually compressed using an existing audio codec and/or processed into a running audio 'fingerprint.' Systems and algorithms that create audio fingerprints (also called 'signatures' or 'robust hashes') are disclosed in a number of U.S. patent applications, such as U.S. Pat. App. Pub. No. 2010/0145708 cited above. Audio fingerprints provide information about the audio in a compact form that allows fast, accurate identification of content. Those of skill in the art will be able to devise suitable techniques for analyzing incoming signal data, applying the most applicable fingerprinting algorithms, and storing the resulting fingerprint data. As a result, each fingerprint buffer 124 will contain fingerprint information for a given length of broadcast. A preselected amount of digital signal data, corresponding to a given number of seconds of broadcast or a given number of bytes, can be stored in a buffer such as signal buffer 122a. The system then processes that data and stores it in fingerprint buffer 124a, discarding the oldest data in the buffer to make room for new data.

Figure 1C:
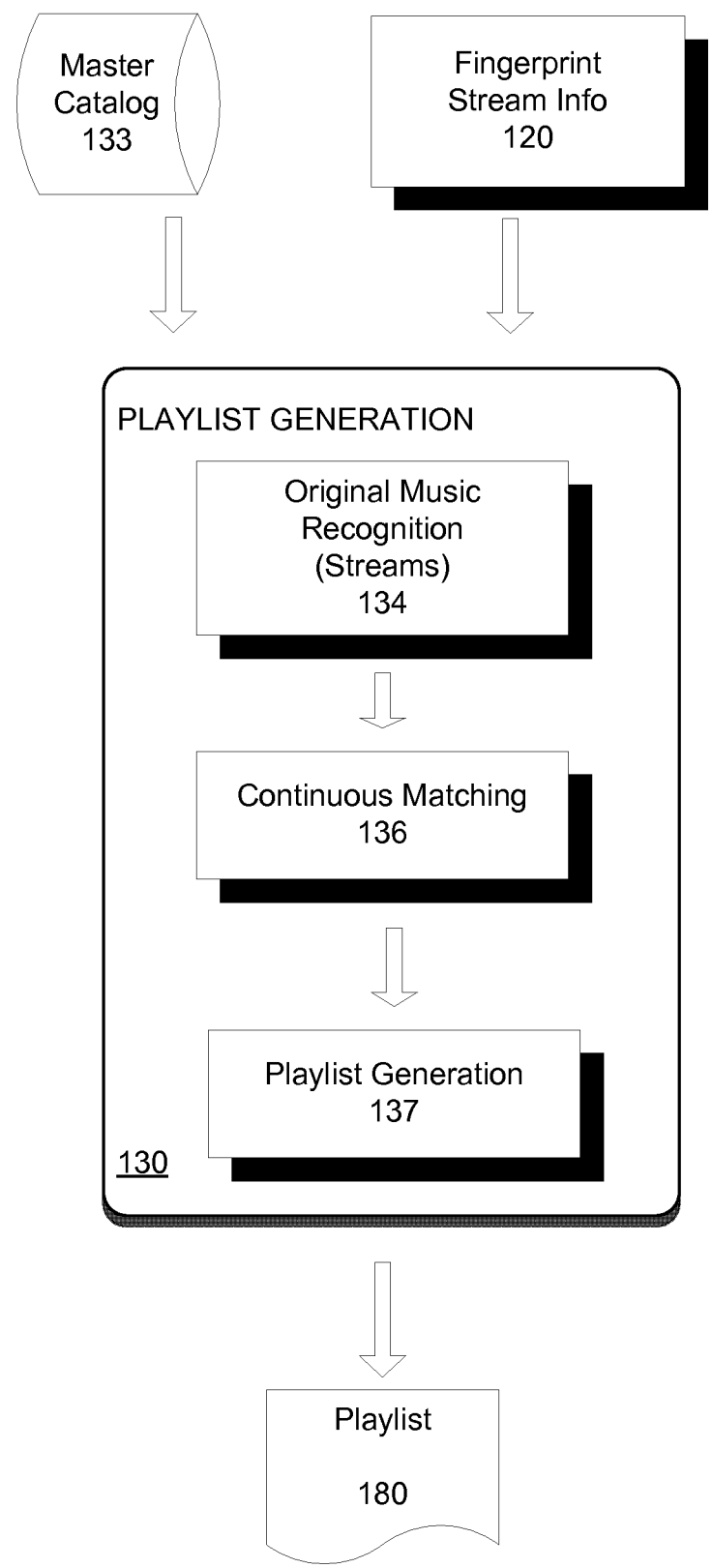

The stream monitoring system 100, including receiver 110 and fingerprint module 120, operates on multiple station streams on an ongoing basis, maintaining the resulting sets of fingerprint data available for analysis at all times, for each of the monitored broadcast sources. In addition to the data contained in the signal buffers and fingerprint buffers, any metadata that was broadcast alongside with the audio or audio/visual content (such as RDS or equivalent) is also stored by fingerprint module 120, in metadata buffers 126a, 126b . . . 126n. This data commonly includes information such as the broadcast station call letters, the name of the program or particular musical piece being broadcast, and other information that might be of interest to a user. The system keeps track of all such data, and time-stamps it FIG. 1C presents the playlist generation module 130, which receives fingerprints from the fingerprint module 120, analyzes that information, and generates playlists 180 for each broadcast stream. Fundamentally, module 130 monitors the streams from the monitoring system 100 and uses the fingerprint data to recognize the content of the streams. To accomplish that task, short segments of fingerprints 120 from each monitored stream are first fed to an Original Music Recognition module 134. There, the fingerprints are subjected to the analysis disclosed in the '708 Patent Publication discussed above. Briefly, this analysis treats short fingerprint segments corresponding to recent station data as a query, to be matched against a catalog of audio recordings 133. The catalog is preloaded as a large index of catalog content. OMR module 134 is capable of identifying the specific recording, and its time alignment, and retrieving the corresponding catalog information. Specific techniques for doing such matching are disclosed, for example, in the cited patent application publications. Additional data may be associated with each catalog entry Although the techniques employed by original music recognition module 134 will suffice to identify the content contained in the fingerprints fed to the playlist generation module 130, improved operation can be achieved by adding a continuous matching module 136. As set out more fully in the '735 Provisional Patent Application cited above, continuous matching takes advantage of the fact that most broadcast content lasts for at least several moments, and certainly longer than the sampling interval employed in the station monitoring module 100. Specifically, continuous matching technology predictively caching of audio fingerprint sequences and corresponding audio item identifiers from a server after storing audio fingerprints extracted from the audio signal. A tracking cache and a watching cache are collectively referred to as "predictive cache(s)", because the fingerprint or audio feature sequences are predicted to follow received segment data of the audio signal that has been at least partially recognized. The technology also includes using the predictively cached audio fingerprint sequences to identify an audio item within the audio signal based on at least some additional audio fingerprints of the audio signal.

In an alternative embodiment, the predictive caching method set out above can be applied to the user query. The query must be sufficiently lengthy to provide multiple segments, but those segments can be fingerprinted and predictively cached, applying the techniques of the '735 Provisional Patent Application in the same way as disclosed for the broadcast stream.

The continuous monitoring module checks to determine whether the content of a present sample is related to previous content, and if so, no need exists to perform a query to the database in the master catalog 133. Because database access is easily the largest time factor in contemporary processing systems, considerable efficiency can be gained through continuous matching techniques.

As each fingerprint is identified by OMR module 134, as may be supplemented by continuous matching module 136, playlist generation module 137 compiles that information (and integrates it over time, checking for consistent alignments and other reliability factors) into a playlist 180 for each broadcast stream. The playlist can be configured to provide data content and format as desired by a user, but it would be expected that playlist 180 would include at least the identified content, the time that the content was broadcast, and perhaps information about signal quality or the like. Uses of the playlists so compiled are discussed in more detail below. Station monitoring module 130 operates continuously to generate an ongoing playlist for each broadcast stream for which fingerprints 120 are being prepared. It will be understood, of course, that the station playlist will be stored on a permanent medium, for future reference in various applications, but items may be removed from the "most current playlist" at any time, as desired.

It should be understood that playlist 180 does not constitute a simple text list of broadcast content. Different systems can be designed to produce playlists of varying scope, but the illustrated embodiment includes all received and analyzed information about the given broadcast stream and its content. For example, fingerprints, metadata, and other information are combined into a suitable data structure provide a readily accessible source of comprehensive information about the broadcast stream. From that data structure, reports or other output can be generated in whatever format and including whatever content might be desired.

Figure 1D:
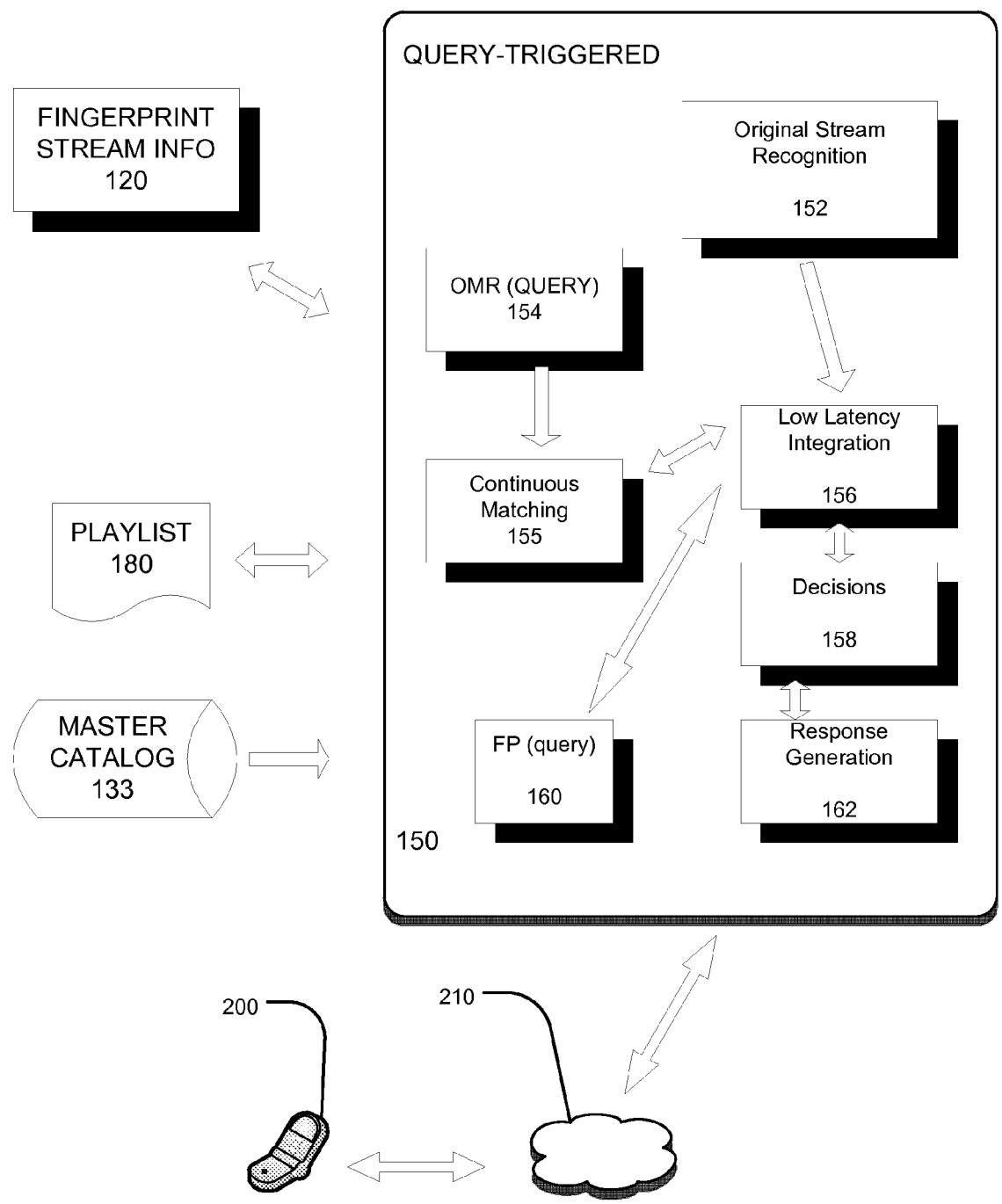

While the playlist generation module 130 operates on a continuous stream basis, FIG. 1D depicts query triggered processing module 150, which operates only when required. This module operates asynchronously responding to user queries. As used here, "query" refers to a segment of audio signal presented to the system by a client. The audio signal may have been captured by a client's microphone or similar device, and the query includes a time stamp and length identifier. The term "query" also denotes the corresponding fingerprint information, together with any additional context data. Alternatively, the query audio, fingerprint or other context information could originate from the client device itself, such as a portion of playback of a previously captured audio signal or track. Moreover, a user can submit a query by sending a transmission to a dedicated website or URL, or alternatively, the user can employ an app or plug-in. In the latter scenario, a user would simply press or click on a screen button or location, and the app or plug-in would extract an audio snippet of appropriate duration from whatever audio content is currently running on the user device, and then transmit that snippet to the system. A large number of interface methods are possible to transmit this knowledge, as will be apparent to those of skill in the art. Alternatively, a query could be a portion of streaming audio, or the audio portion of streaming video, from a radio station, television station, or website. Most often, queries will be delimited, providing relatively short segments of audio signal. If desired, however, the user may forward extensive streams of audio material for analysis.

However generated, the query is received into the query-trigger operations module 150 by query fingerprinting module 160. Upon receiving the communication, query fingerprint module 160 generates a fingerprint from the query, employing the techniques described above. The detailed process for processing the query is set forth below, in connection with FIG. 4. The discussion here will focus on the modular structure of the query-triggered operations module 150, and the discussion below will expand upon that discussion to set out the processing method. As can be noted from the drawing, the central point of query-triggered operations module 150 is the low latency integration module 156. That module receives input from three sources: One input flows from query fingerprint module 160.

Then, broadcast stream fingerprint information from fingerprint module 120 is input to OMR module 154, which performs an OMR analysis as described above in connection with the playlist generation module 130. As was true with playlist generation module 130, OMR module 154 suffices to provide an identification of stream content, but operation can be improved through the application of continuous matching. Thus, OMR results are fed to a continuous matching module 155, which proceeds as set out above, and in the '735 application cited. The results of that analysis form a second input to low latency integration module 156.

Identity of the broadcast stream itself is determined by original stream recognition model 152. The identification process compares the query fingerprint to the data contained in fingerprint buffers 124a, 124b . . . 124n (FIG. 2), which is available to OSR module 152 through fingerprint and stream info module 120. Here, the fingerprint produced for the query is not compared to a pre-loaded database, but to the data in each fingerprint buffer 124; closely matching fingerprints will indicate the source of the query. In addition, metadata received along with the broadcast stream and also stored in the metadata buffers 126a, 126b, etc. The match score and the metadata associated with the identified source of the query (or better, a few top scoring hypotheses) is then forwarded to the low-latency integration module 156, which can often choose among competing hypotheses using more context, such as GPS data, or previous audio content. Stream recognition data from module 152 forms a third input to low latency integration module 156.

After determining whether the query finds a catalog match in OMR module 154 and whether it finds a stream match in OSR module 152, information concerning any matches found, together with relevant metadata, is returned to low latency integration module 156. Before proceeding with the analysis, certain limits must be applied on the relative delay allowed in a match. As is generally known, a website affiliated with a broadcast source will usually stream content with a delay, typically around 2 minutes, after the actual broadcast of that content; hence the online broadcast signal will typically reach the system after the query. With an antenna receiver, the delay is much shorter, and in the other direction: in this case, the reference broadcast stream usually reaches the system before the query. Additional delays may be introduced by network latency, buffering and processing. Data stored in the signal buffers 122 and the fingerprint buffers 124 are date stamped as of the time of capture, as is the query. Those of skill in the art can employ the date stamps and knowledge of the particular systems or sources to approximate and compensate for time delays in either direction. In addition, methods employed to compensate for such delays are set out in the '735 Provisional Patent Application, identified above. In either case, matches are only allowed within certain delay bounds; within these limits, the system usually selects the best matches, according to a preferred scoring scheme. A variety of scoring schemes have been described for OMR systems, such as previously referenced.

The results of the analysis performed in OMR module 154 and OSR module 152, together with scores, associated data, and metadata, are fed back to integration module 156, where the results of OSR, OMR, and other analysis is combined and is fed to decision module 158. That module decides whether to choose a catalog match (the OMR successfully identified content), a stream match (the OSR successfully identified the broadcast source of the query), or both, or neither. Note that time is of the essence, and low latency is important. Hence, some decisions may be reached very quickly at one point, and revised or complemented later. The decision module 158 may use additional factors in arriving at a decision. For example, if GPS information is available from the user's device 150, or from some other source, information about the known location of the user can be matched with information about the known information of the identified source to validate that match. Additionally, if the broadcast source identified in the query search has published a playlist, and that playlist has been obtained, information there can be cross checked against information gained from a catalog match. Information such as the GPS data and playlists, as well as other information that might be helpful in validating matches can be obtained by integration module 156. Specific criteria for determining when and how to approve catalog and stream identifications will generally be specific to the current scenario. Here, the scenario information could relate to the broadcast streams, to the broadcast sources themselves, or other information about the particular environment. Those of skill in the art can start with the identification procedure set out in the patent publications cited above and modify those criteria as necessary to suit a particular environment.

Once the decision has been made about whether and what kinds of matches have been identified, response generation module 162 assembles the information required to display results to the user. Where a stream match identifies one or more broadcast sources, such as a radio station, relevant available information, such as the station URL and other metadata associated with that station, as well as any information gleaned by the system may be sent to user device 150. The user display process can be controlled by a number of parameters, some of which may depend on the characteristics of the specific user device. These parameters may be customized to maximize perceived benefits to the user, to broadcast sources, or to any other service provider facilitating the matching process.

A number of ancillary services can be bundled with the simple presentation of matching data. For example, although many radio stations compile and distribute playlists, those playlists do not necessarily correspond to the actual content broadcast by the station. The system of the present disclosure can compile a complete playlist of the music actually broadcast by given station, by a straightforward use of the fingerprint module 120, operating together with the OMR 154 and OSR 152, operating under control of integration module 156. The final product of that operation could be a playlist 180, which could then be furnished to the broadcast station, to third parties, and to any user so desiring.

A useful variant of this is to display for the user the last few songs played on a particular radio station (the last 10 songs, for example). It is interesting in its own right, but this also corrects a weakness of pure catalog-based systems. If the user was listening to a song on the radio and wanted to identify it, but had missed the end of it, or perhaps wasn't able to open the OMR module right away, the song ID won't be available to the user. When used with OSR, when the system identifies a radio station, the last few songs played will be shown, and the user can find without any additional effort what song or songs were missed in the recent past.

The same 'weakness' may be corrected in general by having the system automatically remember recent audio, using a circular buffer to hold, say, the last few minutes of audio. In this case, the user might have to request 'retroactive' matching. An entirely passive variant of this idea is described in the previously referenced Continuous Audio Matching patent application.

Alternatively, response generation module 162 could correlate information about the query, the particular broadcast outlet being listened to, and possibly the user's location, to offer particular products and services to the user. Special advertisements or discount offers could be made available by the offering outlet for users characterized by particular parameters. Once the system recognizes that the user meets those criteria, the special offer can be forwarded to user device 200 for display to the user.

As a further alternative, information can be fed to the user in stages. Results of a first match can be quickly provided to the user, and then additional, or premium, content can be provided as a follow-on service. Once the user's listening status is known, the system can use the searching capabilities of integration module 156, for example, to gather additional information about the source, or about the particular music being played. A special price for a CD by the artist being played could be offered, for example. Such additional information could be offered on a special subscription basis to particular users as an additional means of monetizing the service.

Another alternative use of matching a stream is to report "check-ins". Upon a successful match with a broadcast station, when the user has given sharing permission for Facebook or for Twitter, the system can post a message such as, for example: "Jon is listening to 96.5 KOIT". This could be very valuable for radio or TV stations as it lets them participate in the "checking in" social networking phenomenon, including tweets, news feeds, sponsored stories and the like. This can be monetized like an ad impression.

Another potential approach to monetizing this service could be to provide information back to broadcasters on a subscription basis. The system will accumulate a large volume of data indicating user listening patterns relating to particular programs, music, times of day, and the like. That information would be highly valuable to broadcast station owners. That information is considerably less time sensitive than is the immediate feedback described above, giving the system operator opportunities to assemble, collate, and present the information in a number of formats.

Figure 3:
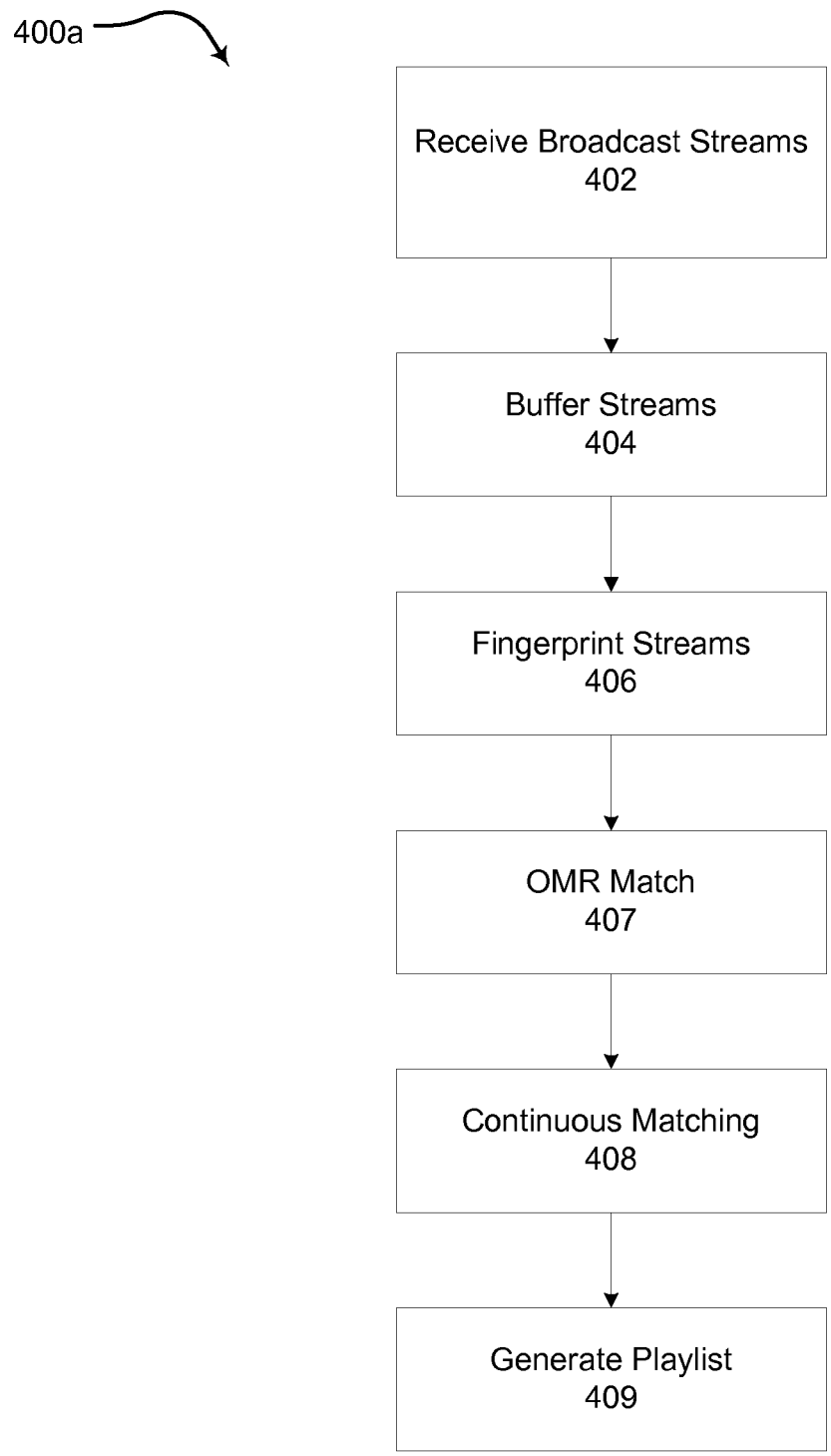
FIG. 3 is a flowchart, setting out an embodiment of a process in accordance with the present disclosure.
Figure 4:
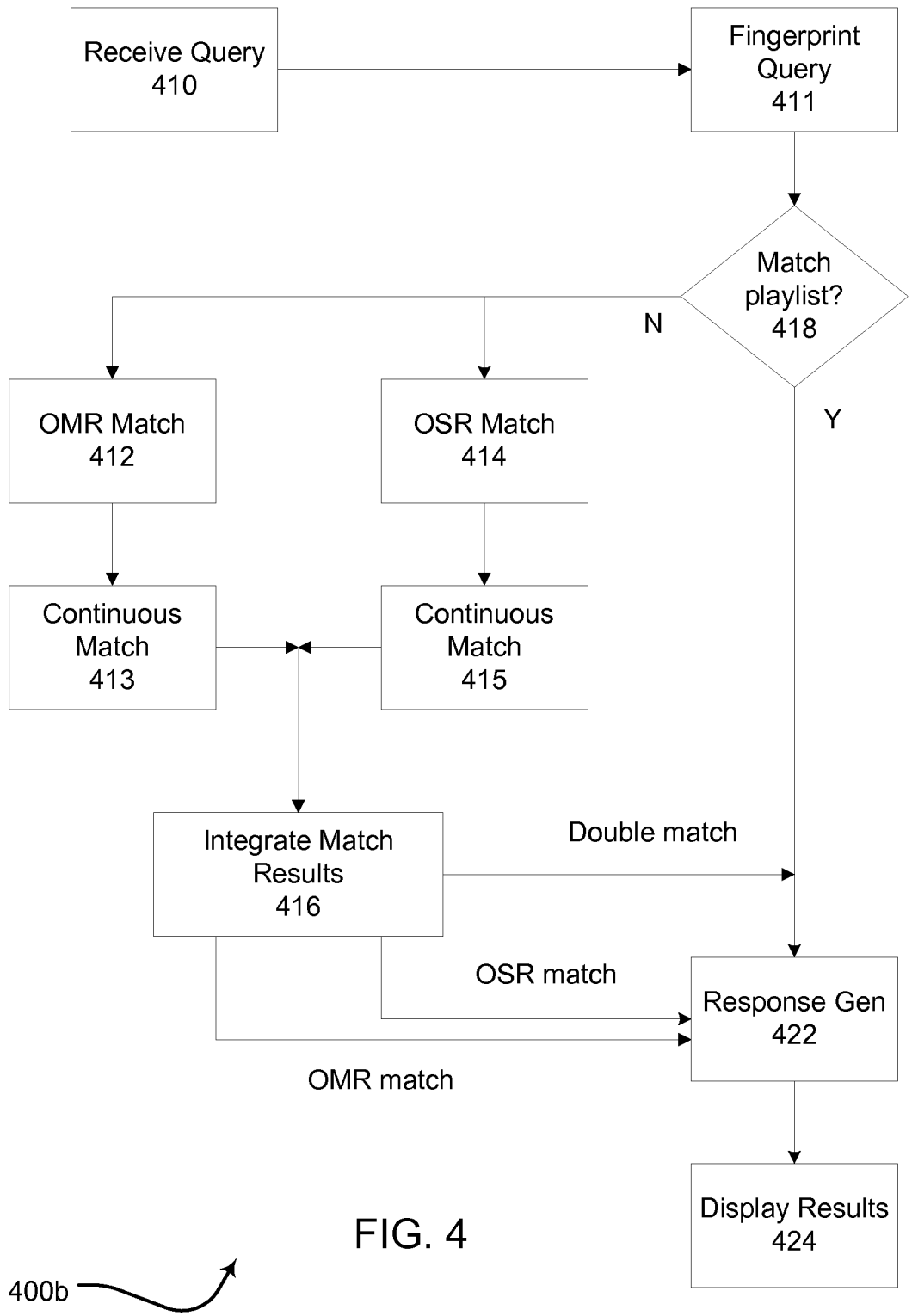
FIG. 4 is a flowchart, setting out a further embodiment of a process in accordance with the present disclosure.

FIGS. 3 and 4 illustrate a process 400*a* and 400*b* for implementing the present disclosure by identifying both the broadcast stream and its content. As should be clear from the description above, a number of processes are occurring simultaneously within the various modules of the present disclosure. The steps of process 400*a*, 400*b* set out in sequential fashion the steps from receiving broadcast streams through the distribution of final results, but those of skill in the art will recognize that numbers of the steps will be occurring simultaneously, and others may be performed in various stages or orders. It is specifically stated here that the order in which steps are discussed below should not be understood as a disclosure or limitation of the order in which the steps are performed.

FIG. 3 illustrates process 400*a*, which identifies broadcast stream continuously. This process begins with the receipt of broadcast streams, at step 402. Here the system is designed with a particular number of broadcast streams in mind. For some applications, this number could be relatively small, in the tens of total streams. For systems serving a large metropolitan area, however, a large number of streams will be provided, accommodating not only the existing AM and FM radio stations, but also the hundreds of stations offered on satellite systems such as Sirius or XM. As explained in conjunction with fingerprinting module 120 (FIGS. 1, 2), overall broadcast data from each strain is first buffered (step 404) to establish a data set of a selected time-slice of the broadcast signal. As the data is fed into the buffers, data fingerprints are taken, in step 406. Steps 404 and 406 result in the creation of a number of stream fingerprints, ready for matching with other data. Each of the streams is continuously updated for so long as the broadcast stream is received.

It will be understood that steps 402-406 continue independently, having no regard to the rest of the system steps. For so long as the system is operating, steps 402-406 continue to receive data and prepare it for processing by the remainder of the system. It will be further understood that process 400*a* operates completely apart from any user query input, although a different embodiment could combine the two processes under correlated control systems, as understood in the art. Here, the purpose of the process 400*a* consists directly in obtaining and processing broadcast stream content and identification. Rather than depending upon interaction with users, this system exists to obtain and compile data about broadcast activity, and information about that activity can be organized and deployed as desired.

Process 400*a* employs the resources of stream monitoring system module 100 and station monitoring module 130 to identify incoming broadcast streams. This process begins by receiving broadcast streams at step 402, and those streams are buffered at step 404 and fingerprinted at step 406. The system then performs an OMR match at step 407. As noted above, the OMR match may be supplemented by a continuous matching step 408, employing the techniques described above and in the '735 application. The OMR match being complete, the information gained from that analysis is incorporated into a station playlists at step 409. Although the absence of user queries may call for some changes in the detailed implementation of process 400a the key points of the fingerprinting, content identification, and broadcast stream identification are set out above.

FIG. 4 sets out a process 400b initiated by receipt of a query from a user, at step 410. First, step 411, the system generates a fingerprint of the query. The first analysis step, 418, compares the fingerprint to the playlist 180. That comparison can be rapidly accomplished, first because the comparison matches fingerprints, and second because the playlist can be available in a cache or other highly accessible data storage location. Moreover, if a match is found with a playlist entry, the remainder of the analysis is completely bypassed, and the process can move directly to response generation, step 422.

Failing a match with a playlist entry, the process proceeds to run both an OMR match and an OSR match, in parallel (steps 412 and 414, respectively). Operation of these matching operations proceeds exactly as set out above. After the OMR and OSR steps, the process may include continuous matching steps 413 and 415. As explained above, OMR and OSR produce the desired results, but continuous matching techniques increase the speed and efficiency of the operation.

The results of the OMR and OSR operations are fed to the integration step 416. There, the results are assessed as falling into one of three possible outcomes: a double match, where the broadcast stream and the content is identified; an OSR match where only the broadcast stream is identified; or an OMR match, where only the content is identified. To allow for the possibility of equivocal results, the integration step may allow different characteristics of the matching process to be given greater or lesser weights in the final determination. Those considerations will vary with every implementation, and those of skill in the art can design appropriate factors to produce desired results.

In response generation, step 422, the process receives the match results and produces appropriate output to the user, which is passed along and displayed in step 424. There, the details of the display will be tailored to each particular system. As known in the art, intercommunication between the user's device and the system can establish the data format preferred by the user's device, and the system can format data accordingly. For example, specific 'apps' may be developed for each type of smart phone or mobile device, and adapted to differently sized devices.

In an alternative embodiment, the response generation step could supplement the response in a number of ways. One embodiment could make use of playlist 180 to list the most recent songs played, along with identifying the specific query content. The system could standardize the number of additional titles provided, or that selection could be made by the user.

Apart from any communication with a user submitting a query, the system maintains information concerning all of the identifications produced for each of the broadcast streams, and such data is handled according to designated uses of that data. Playlist data may be assembled on a regular basis and forwarded to broadcast sources. Data covering playlists for multiple organizations may be compiled and forwarded to marketing organizations, researcher organizations, or other users. Those of skill in the art will appreciate that a wide variety of business applications can be supported through the systems described here.

Conclusion

The specification has described a method for identifying and interacting with a broadcast stream. Those of skill in the art will perceive a number of variations possible with the system and method set out above. For example, speech recognition technology could be employed to identify spoken text in a broadcast stream, and that information could be used in identifying that broadcast stream, or it could be saved as metadata to be forwarded to the user. These and other variations are possible within the scope of the claimed invention, which scope is defined solely by the claims set out below.

We claim:

1. A method of identifying an audio content sample and determining a broadcast station source for a broadcast, including:
    monitoring a plurality of broadcast stations and automatically identifying broadcast audio content from the broadcast stations as it is received;
    caching to memory fingerprints of the identified broadcast audio content from the plurality of broadcast stations;
    receiving a sampled audio content;
    matching fingerprints of the sampled audio content against:
        the cache of fingerprints from the identified broadcast audio content; and
        a database of audio content;
    identifying the sampled audio content and, when the sampled audio content originates from a broadcast, a broadcast station source that was sampled;
    receiving a location from a portable device; and
    using at least the location and the identified sampled audio content to target the portable device for advertising or offers.

2. The method of claim 1, wherein the sampled audio content is received from the portable device.

3. The method of claim 1, further including matching of the fingerprints of the sampled audio content against the cache and bypassing matching against the database if the matching against the cache succeeds.

4. The method of claim 1,
    wherein the sampled audio content is received from the portable device and further including:
        using the location to validate an identity of the broadcast station source.

5. The method of claim 1,
    wherein the sampled audio content is received from the portable device and further including:
        receiving a location from the portable device; and
        using at least the location and the identified broadcast station source to target the portable device for advertising or offers.

6. The method of claim 1, wherein:
    the identified sampled audio content is an advertisement;
    further including using at least the identified sampled audio content and the identified broadcast station source to target the portable device for advertising or offers.

7. The method of claim 1, wherein receiving the sampled audio content includes receiving fingerprints from the portable device.

8. The method of claim 1, further including creating fingerprints from the received sampled audio content.

9. The method of claim 1, further including sending at least some data regarding the identified sampled audio content to the portable device.

10. A method of identifying an audio content sample from a real time broadcast, including:
- monitoring a plurality of broadcast stations and identifying broadcast audio content from the broadcast stations as it is received;
- wherein monitoring at least one broadcast station of the plurality of broadcast stations relies on a web-based feed that is delayed from an over-the-air feed from the same broadcast station;
- receiving sampled audio content from a portable device;
- receiving a location from the portable device;
- identifying the sampled audio content by matching fingerprints of the sampled audio content against a database of audio broadcast content;
- wherein matching the fingerprints of the sampled audio content against the database of broadcast content is limited by a predetermined delay bound; and
- combining the location and the identified sample audio content to identify a broadcast station source which the portable device sampled.

11. The method of claim 10, further including caching fingerprints of the identified broadcast audio content from the plurality of broadcast stations and matching the fingerprints of the sampled audio against the cache of fingerprints.

12. The method of claim 10, wherein:
- the identified sampled audio content is an advertisement;
- further including using at least the identified sampled audio content and the identified broadcast station source to target the portable device for advertising or offers.

13. The method of claim 10, further including:
- generating and saving playlists of the broadcast audio content from the broadcast stations monitored; and
- sending the portable device at least a recent portion of the playlist that identifies a plurality of items broadcast by the identified broadcast station source.

14. A method of identifying an audio content sample that originates from an actual broadcast, including:
- monitoring a plurality of broadcast stations, fingerprinting and saving the fingerprints of broadcast audio content in a database of broadcast content as it is received;
- identifying at least some of the broadcast audio content from the broadcast stations against a database of pre-indexed audio content and caching fingerprints of the identified broadcast audio content as it is received;
- receiving sampled audio content from a portable device;
- matching the fingerprints of the sampled audio content against:
  - the cache of fingerprints for the identified broadcast audio content;
  - the database of broadcast content; and
  - the database of pre-indexed audio content; and
- identifying a broadcast station source of the sampled audio content that originates from an actual broadcast and, when the sampled audio content can be found in the database of pre-indexed audio content, identifying the sampled audio content.

15. The method of claim 14, further including:
- receiving a location from the portable device; and
- using the location to validate an identity of the broadcast station source.

16. The method of claim 14, further including:
- receiving a location from the portable device; and
- using at least the location and the identified sampled audio content to target the portable device for advertising or offers.

17. The method of claim 14, wherein:
- the monitoring of at least one broadcast station relies on a web-based feed that is delayed from an over-the-air feed from the same broadcast station; and
- matching the fingerprints of the audio content sample against the cache is limited by a predetermined delay bound.

18. The method of claim 14, further including:
- generating and saving playlists of the broadcast audio content from the broadcast stations monitored; and
- sending the portable device at least a recent portion of the playlist that identifies a plurality of recent items broadcast by the identified broadcast station source.

19. A method of identifying an audio content sample and determining a broadcast station:
- monitoring a plurality of broadcast stations and automatically identifying broadcast audio content from the broadcast stations as it is received;
- wherein monitoring at least one broadcast station of the plurality of broadcast stations relies on a web-based feed that is delayed from an over-the-air feed from the same broadcast station;
- caching to memory fingerprints of the identified broadcast audio content from the plurality of broadcast stations;
- receiving a sampled audio content;
- matching fingerprints of the sampled audio content against:
  - the cache of fingerprints from the identified broadcast audio content; and
  - a database of audio content;
- wherein matching the fingerprints of the sampled audio content against the database of broadcast audio content is limited by a predetermined delay bound; and
- identifying the sampled audio content and, when the sampled audio content originates from a broadcast, a broadcast station source that was sampled.

20. The method of claim 19, further including:
- receiving a location from the portable device; and
- using the location to validate an identity of the broadcast station source.

21. The method of claim 19, wherein:
- the monitoring of at least one broadcast station relies on a web-based feed that is delayed from an over-the-air feed from the same broadcast station; and
- matching the fingerprints of the audio content sample against the cache is limited by a predetermined delay bound.

22. The method of claim 19, further including:
- generating and saving playlists of the broadcast audio content from the broadcast stations monitored; and
- sending the portable device at least a recent portion of the playlist that identifies a plurality of recent items broadcast by the identified broadcast station source.

23. A method of identifying an audio content sample and determining a broadcast station source for a broadcast, including:
- monitoring a plurality of broadcast stations and automatically identifying broadcast audio content from the broadcast stations as it is received;
- caching to memory fingerprints of the identified broadcast audio content from the plurality of broadcast stations;
- receiving a sampled audio content from a portable device;
- matching fingerprints of the sampled audio content against:
  - the cache of fingerprints from the identified broadcast audio content;
  - and a database of audio content; and identifying the sampled audio content and, when the sampled audio content originates from a broadcast, a broadcast station source that was sampled;

generating and saving playlists of the broadcast audio content from the broadcast stations monitored; and sending the portable device at least a recent portion of the playlist that identifies a plurality of recent items broadcast by the identified broadcast station source.

24. The method of claim 23, wherein the sampled audio content is received from a portable device and further including:

receiving a location from the portable device; and using the location to validate an identity of the broadcast station source.

25. The method of claim 23, further including:

generating and saving playlists of the broadcast audio content from the broadcast stations monitored; and sending a portable device at least a recent portion of the playlist that identifies a plurality of recent items broadcast by the identified broadcast station source.

26. A method of identifying an audio content sample and determining a broadcast station source for a broadcast, including:

monitoring a plurality of broadcast stations and automatically identifying broadcast audio content from the broadcast stations as it is received;

caching to memory fingerprints of the identified broadcast audio content from the plurality of broadcast stations;

receiving a sampled audio content;

concurrently matching fingerprints of the sampled audio content against the database of broadcast audio content and a database of audio content; and identifying the sampled audio content and, when the sampled audio content originates from a broadcast, a broadcast station source that was sampled.

27. The method of claim 26, further including:

receiving a location from a portable device; and using the location to validate an identity of the broadcast station source.

28. A method of identifying an audio content sample from a real time broadcast, including:

monitoring a plurality of broadcast stations and identifying broadcast audio content from the broadcast stations as it is received;

receiving sampled audio content from a portable device;

receiving a location from the portable device;

identifying the sampled audio content by matching fingerprints of the sampled audio content against a database of audio content; and combining the location and the identified sample audio content to identify a broadcast station source which the portable device sampled; and using at least the identified broadcast station source to target the portable device for advertising or offers.

29. The method of claim 28, wherein:

the identified sampled audio content is an advertisement;

further including using at least the identified sampled audio content and the identified broadcast station source to target the portable device for advertising or offers.

30. The method of claim 28, further including:

generating and saving playlists of the broadcast audio content from the broadcast stations monitored; and sending the portable device at least a recent portion of the playlist that identifies a plurality of items broadcast by the identified broadcast station source.

* * * * *